Dec. 2, 1969  W. J. KASSEN  3,482,080
HEATER ASSEMBLY

Filed Nov. 13, 1967  2 Sheets-Sheet 1

INVENTOR.
WILLIAM J. KASSEN
BY Flehr, Hohbach, Test,
Albritton & Herbert
ATTORNEYS Dec. 2, 1969    W. J. KASSEN    3,482,080
HEATER ASSEMBLY Filed Nov. 13, 1967    2 Sheets-Sheet 2

INVENTOR.
WILLIAM J. KASSEN
BY Flehr, Hohbach, Vest,
Albritton & Herbert

ATTORNEYS

United States Patent Office 3,482,080
Patented Dec. 2, 1969

3,482,080
HEATER ASSEMBLY
William J. Kassen, 23680 Wooded Glen Way,
Los Altos, Calif. 94022
Filed Nov. 13, 1967, Ser. No. 682,215
Int. Cl. H05b 3/58, 3/34, 3/54
U.S. Cl. 219—535
5 Claims

ABSTRACT OF THE DISCLOSURE

A flexible, high temperature heater assembly for relieving stresses associated with welded joints. Said assembly comprises a base, individual support members attached to the base which mount a serpentine wound heating element, an outer shield and insulation means between said base and outer shield. Also provided are expansion means attached to the outer shield and clamping means for clamping ends of the heater assembly to one another.

BACKGROUND OF THE INVENTION

In the fabrication of welded pipe systems, vessels and the like, the weld joints are generally under stress. The stress arises because of the difference in the coefficient of expansion of the welded metal and weld metal. The stress can be relieved by making the weld metal more ductile by heat treatment. For this purpose, various methods of heating the weld joint for a predetermined period of time and gradually cooling the joint have been devised.

One such method employs electrical heating elements which are placed in heat exchange relationship with the weld. For example, the heating elements may be wrapped circumferentially around the pipe and joint. Insulating material is then applied to the outside of the heating element to confine the heat. The element is heated by applying an electrical current from a suitable power source such as a welding generator. The joint is heated until it reaches a predetermined temperature and is maintained at the temperature for a predetermined time, after which it is gradually cooled.

The installation of heaters of this type is generally time consuming. Furthermore, it requires a person knowledgeable with electricity to make the necessary electrical connections.

SUMMARY OF THE INVENTION AND OBJECTS

The present invention relates generally to a flexible, high temperature heater assembly which is simple in construction and relatively easy to use.

The heater comprises a flexible perforated heater support which carries support members for receiving and supporting an electrical resistance heating element. Insulating means and an outer shield surround and are connected to the heating element to confine the heat produced by the heating element and direct it through the perforated support to heat a pipe or member with which the heater is associated.

It is a general object of the present invention to provide an improved flexible heater assembly.

It is another object of the present invention to provide a heater assembly which is simple in construction and efficient in operation.

It is another object of the present invention to provide a flexible, high temperature heater assembly containing its own insulation and shield to minimize heat losses.

These and other objects of the invention will become more clearly apparent from the following description when taken in conjunction with the accompanying drawing.

DESCRIPTION OF THE PREFERRED EMBODIMENT

Figure 1:
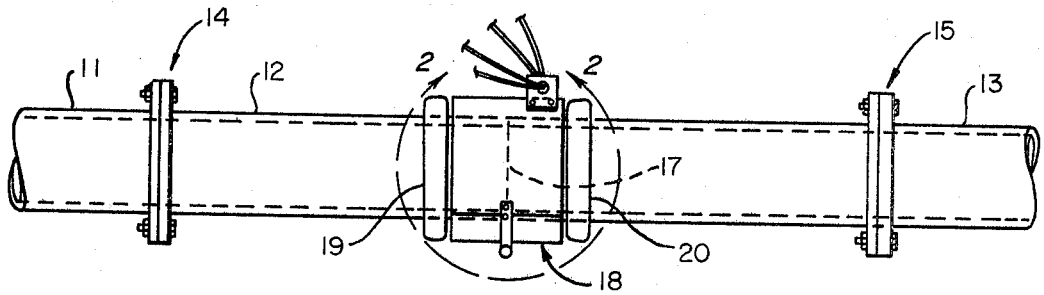
FIGURE 1 is an elevational view showing a pipe assembly with a heater in accordance with the invention applied thereto.

In FIGURE 1, there is shown a piping system including pipe sections 11, 12 and 13 connected to one another by flanges 14 and 15. The pipe section 12 includes a weld joint 17. A flexible heater assembly 18 is wrapped around the pipe section 12 in the region of the joint 17. Guard insulators 19 and 20 are shown associated with the ends of the heater to confine the heat to the region of the heater and minimize the heat loss.

Figure 2:
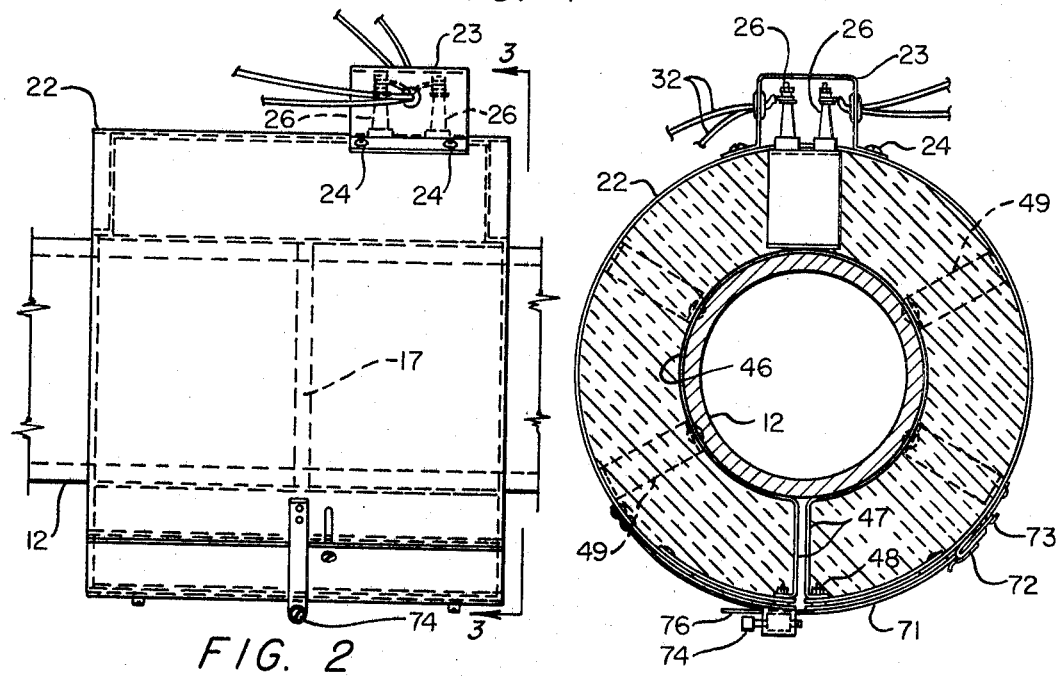
FIGURE 2 is an enlarged view of FIGURE 1 showing the heater and associated pipe.
Figure 3:
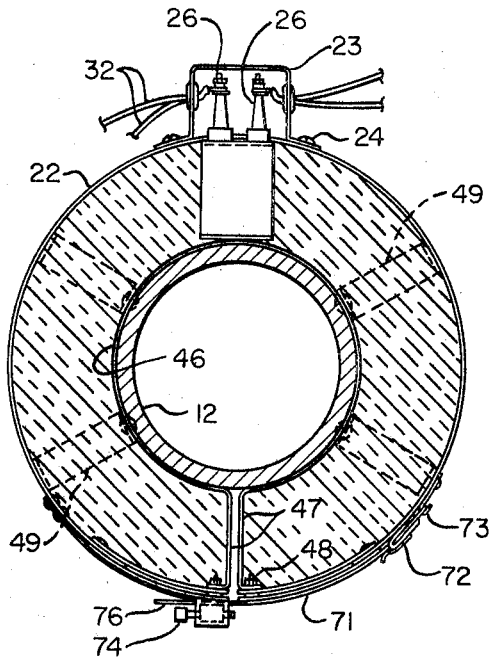
FIGURE 3 is a view taken generally along the line 3—3 of FIGURE 2.
Figure 4:
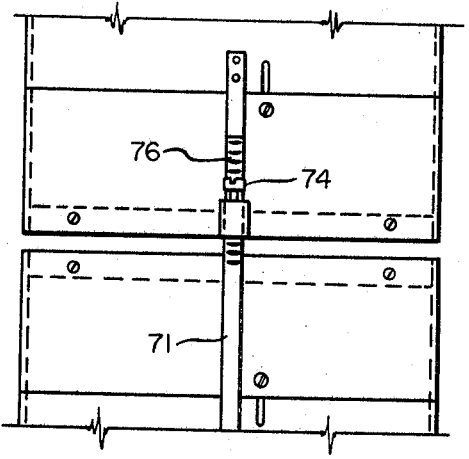
FIGURE 4 is a view showing the clamping means associated with the heater assembly.
Figure 8:
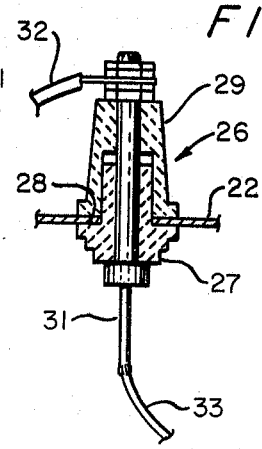
FIGURE 8 shows an electrical stand-off associated with the input terminals.

Referring more specifically to FIGURES 2 and 3, the heater assembly comprises an outer shield 22 which supports a terminal housing 23. The housing 23 may be secured to the outer shield by means of screws 24. Within the terminal shield are disposed insulators 26 which provide a lead-through to the heating element. Reference is made more particularly to FIGURE 8 wherein an insulator is shown in detail. The insulator comprises a first section 27 which is adapted to extend through a hole in the outer shield 22. The first section includes a shoulder 28 which abuts against the shield. A second section 29 is adapted to fit over the end of section 27 to sandwich the shield 22 therebetween. Conductor 31 extends coaxially through the sections 27 and 29. The input leads 32 are secured to one end and the heating element 33 is connected to the other end.

Figure 10:
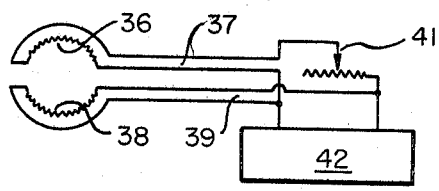
FIGURE 10 schematically shows the electrical circuit and heating element.

In accordance with the present invention, there are four such lead-throughs in the form of two pairs; one pair associated with an upper heater element and the second pair with the ends of a lower heater element whereby the upper and lower heater elements may be independently energized. This is schematically shown in FIGURE 10 wherein the upper heater element 36 is shown associated with a pair of leads 37 and the lower heater element 38 is shown associated with a pair of leads 39. One of the upper leads 37 is connected to the movable contact 41 of a rheostat whereby resistance may be placed in series with the upper heater. The amount of power applied to the upper heater may be controlled. The two heaters 36 and 38 are connected in parallel to a power source 42. In general, the amount of power applied to the upper heater to maintain a given temperature will be less than that applied to the lower heater because heat from the lower heater rises.

The heater includes an inner perforated heater support 46 (FIGURES 3 and 5) whose ends 47 extend radially outwardly and are suitably secured to the outer shield 22 as, for example, by means of screws 48.

The spacing between the outer shield 22 and the inner perforated heater support is maintained by means of spacers 49. The spacers may be in the form of U-shaped members secured to the perforated support 46 and adapted to abut the outer shield 22.

Figure 5:
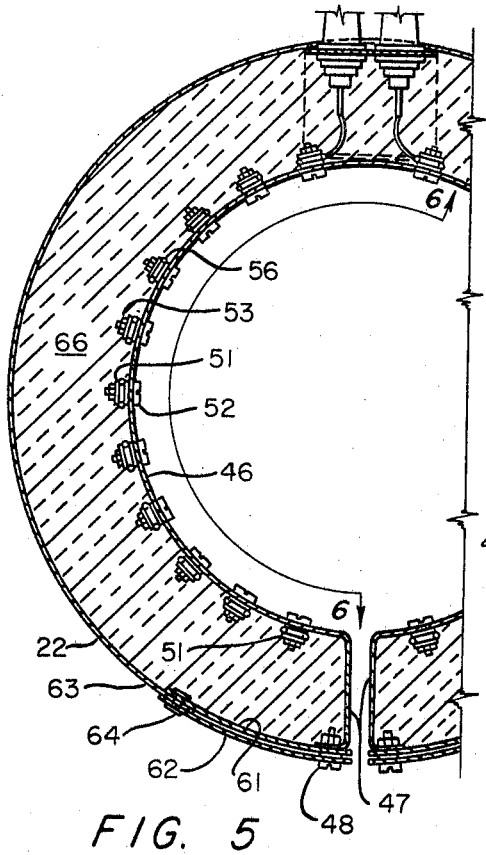
FIGURE 5 is an enlarged view of a portion of the heater showing the electrical connection and the expansion means in the outer shell.
Figure 6:
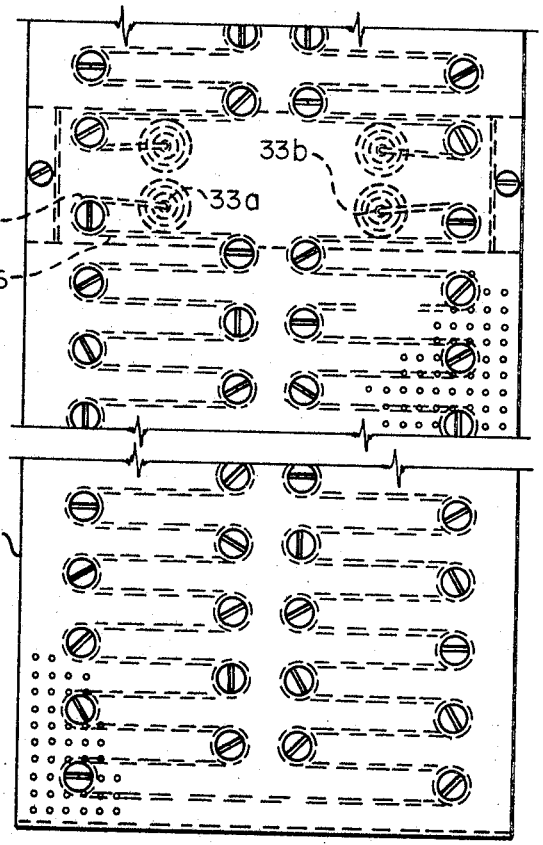
FIGURE 6 is an enlarged view taken generally along the line 6—6 of FIGURE 5 showing the perforated heater support.
Figure 9:
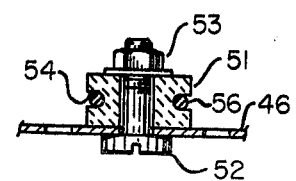
FIGURE 9 shows a heating element support member carried by the perforated inner shield.

Referring more particularly to FIGURES 5 and 6, the perforated heater support 46 is shown in more detail. The heater support serves to support a plurality of spaced mounting members 51 which are made of insulating material. Referring particularly to FIGURE 9, an insulating member 51 is shown mounted to the perforated support 46 by means of a threaded screw 52 and nut 53. It will, of course, be apparent that the support 51 might be riveted to the perforated heater support. The insulating member 51 includes a circumferential groove 54 adapted to receive electrical resistance heating element 56.

Referring to FIGURE 6, the heating element is shown as having one end secured to lead-in 33a and its other end secured to lead-in 33b. The heating element is supported adjacent the inner surface of the perforated member by the members 51 and zigzags or serpentines along one side of the associated perforated section 46 and back along the other side. This design permits bending of the perforated support without loosening of the heater element from the members 51.

The flexible heater assembly in accordance with the present invention may be expanded to be placed around a pipe or may be expanded and joined with another heater whereby two or more heaters may be connected in series to surround a larger pipe. In order that the outer shield not buckle as the heater assembly is opened and closed, the outer shield includes expansion means. Such means are shown in FIGURE 5 as comprising a pair of spaced sections 61 and 62 which slidably receive therebetween the end 63 of the shield 22. A lug 64 secured to the end 63 rides in an elongated slot formed in the sections 61 and 62. This permits guided movement of the end 63. Any differences in length of the outer shield as the heater is opened and closed will be accommodated by the expansion joint just described.

It is seen that the heating element itself is supported in spaced relationship closely adjacent to the perforated support. Disposed between the heating element and the outer shield is insulating material 66 which serves to confine the heat to the inner portion of the heater and to cause the heat to radiate through the perforations to heat an associated pipe section.

The heater includes securing means which are in the form of a strap having a section 71, FIGURE 3, and a snap buckle 72 which is adapted to engage hook 73 carried by the outer shield. When the buckle is snapped, the heater is secured about a pipe section. In order to accommodate the heater to pipes having varying diameters, the strap 71 includes an expansion means in the form of a screw 74 which engages the slotted section 76 of strap 71. By turning the screw 74, the strap 71 is extended or retracted.

When two or more heaters may be connected in series to surround a larger pipe, the buckle 72 of one heater will engage the hook 73 of the associated heater to form a two-heater assembly.

Figure 7:
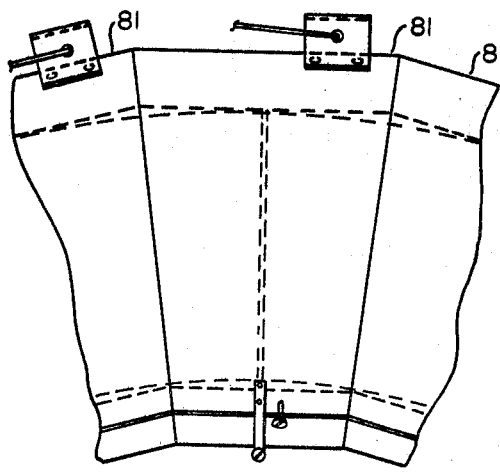
FIGURE 7 is a view showing a heater adapted to be used in connection with a curved pipe.

In certain instances it is desirable to be able to heat welded sections at the corner or curves in a pipe. For this purpose, the heater may be in the form shown in FIGURE 7 wherein one side of the heater 81 is wider than the other side to thereby provide a shaped heater section.

As described briefly in connection with FIGURE 1, in addition to the insulating means disposed between the heating element and the outer shield, there may be provided guard insulation. In the example shown, the guard insulation is in the form of doughnut-shaped insulators 19 and 20 disposed at the side edges of the heater.

Heater assemblies of the type described are self-contained including insulation and shielding and are flexible whereby to enable association of the heater with a joint to be relieved. Heaters in accordance with the invention have been operated to temperatures as high as 1850° F.

I claim:
1. A heater comprising a flexible heater support of predetermined configuration including first and second ends, a plurality of support members individually secured to said support adjacent one face of the same, each of said support members including a groove spaced from said heater support, an elongated heating element mounted in said grooves on said support members, said heating element zigzagging around said support members, a flexible outer shield having said predetermined configuration spaced from said heater element with the corresponding ends of said support and shield joined to one another, spacer means disposed between said shield and said support for maintaining the same in spaced relationship with respect to one another, insulating means interposed between said heating element and said outer shield, and expansion means forming part of said outer shield to permit the shield to elongate and shorten as the heater assembly is opened and closed.

2. A heater assembly as in claim 1 including clamping means associated with said ends for clamping the ends to one another or to the ends of an associated heater assembly.

3. A heater assembly as in claim 1 wherein said heating element includes two independently energized sections.

4. A heater element as in claim 3 including resistive means connected in series with one of said sections.

5. A heater assembly as in claim 1 in which said expansion means includes a pair of plates adapted to slidably accommodate the end of said shield.

References Cited

UNITED STATES PATENTS

| | | | |
|---|---|---|---|
| 2,160,758 | 5/1939 | Schurman | 52—573 X |
| 2,390,475 | 12/1945 | Thomas | 219—535 |
| 2,584,302 | 2/1952 | Stein | 219—535 X |
| 2,633,522 | 3/1953 | Berg et al. | 219—535 X |
| 3,000,433 | 9/1961 | Kemper | 138—149 X |
| 3,393,297 | 7/1968 | Hart | 219—535 X |
| 2,809,265 | 10/1957 | Jackson | 219—536 X |
| 3,423,570 | 1/1969 | Trablicy | 219—535 X |

JOSEPH V. TRUHE, Primary Examiner

M. C. FLIESLER, Assistant Examiner

U.S. Cl. X.R.

138—149; 219—301, 528